United States Patent [19]

Jensen

[11] 3,898,651

[45] Aug. 5, 1975

[54] MEMORY NOISE CANCELER

[75] Inventor: Garold K. Jensen, Alexandria, Va.

[73] Assignee: The United States of America as represented by the Secretary of the Navy, Washington, D.C.

[22] Filed: Apr. 2, 1969

[21] Appl. No.: 812,938

[52] U.S. Cl............ 343/5 DP; 343/7.7; 343/17.1 R
[51] Int. Cl.²........................ G01S 9/02; G01S 9/42
[58] Field of Search.............. 343/5, 5 DP, 7.7, 17.1

[56] References Cited
UNITED STATES PATENTS

| 3,386,077 | 5/1968 | Molho | 343/17.1 X |
| 3,404,399 | 10/1968 | Eschner, Jr. | 343/7.7 |
| 3,422,435 | 1/1969 | Cragon et al. | 343/5 DP |

Primary Examiner—Malcolm F. Hubler
Attorney, Agent, or Firm—R. S. Sciascia; Arthur L. Branning

[57] ABSTRACT

A noise canceler for use with radar memory stores wherein memory store output signals below a predetermined value are subtracted from the memory store input and memory store output signals above the predetermined value are displayed.

8 Claims, 1 Drawing Figure

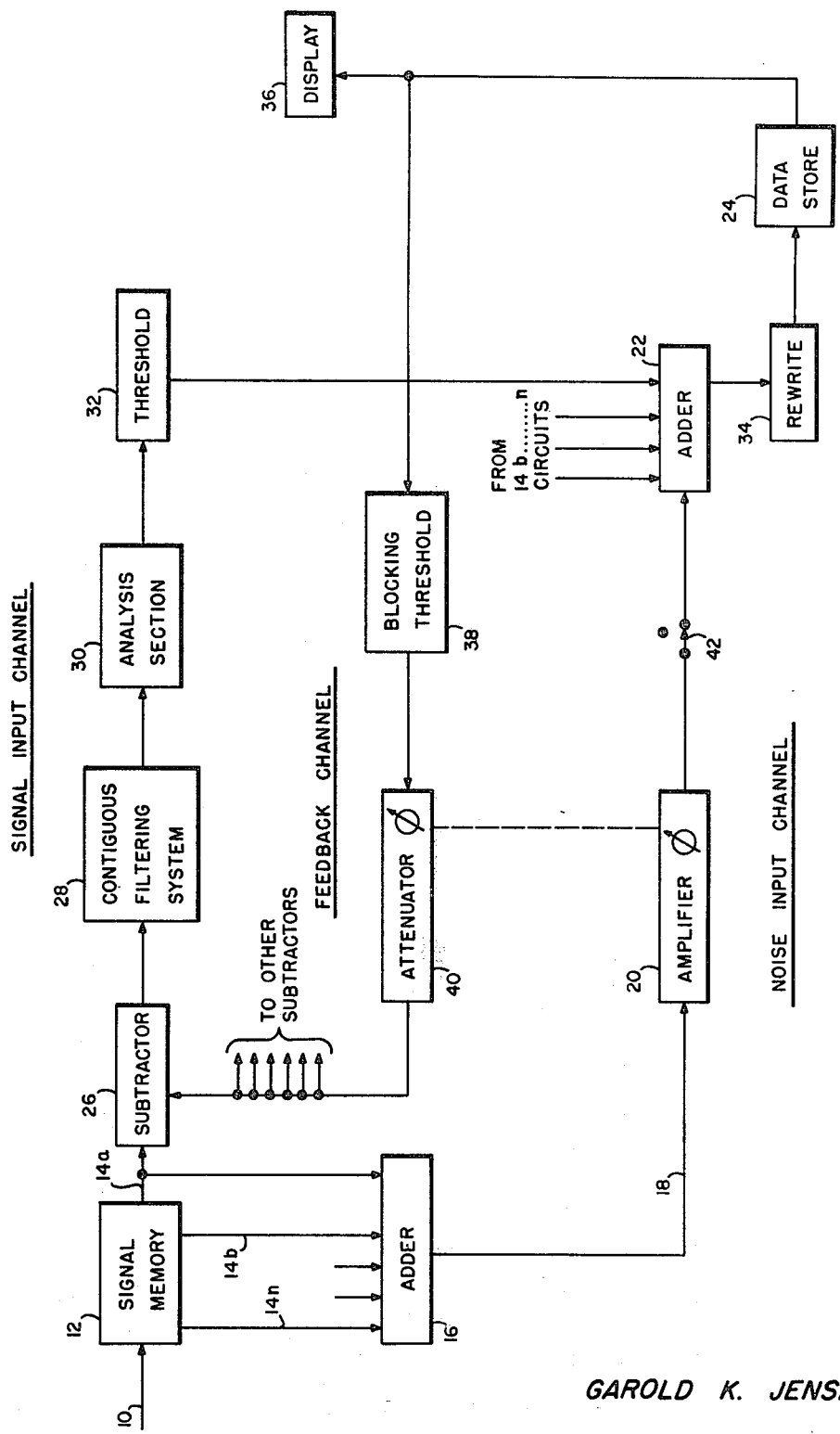

_

MEMORY NOISE CANCELER

STATEMENT OF GOVERNMENT INTEREST

The invention described herein may be manufactured and used by or for the Government of the United States of America for governmental purposes without the payment of any royalties thereon or therefor.

RELATED APPLICATIONS

This invention can be used in a radar such as is disclosed in patent application Ser. No. 650,157 filed by Garold K. Jensen of June 27, 1967 for a RADAR SIGNAL ANALYZING SYSTEM. Patent application Ser. No. 812,934 filed by Garold K. Jensen on Apr. 2, 1969 for Analog Memory Retention Time Extender discloses circuitry which is suitable for use as the rewrite component in this invention.

BACKGROUND OF INVENTION

For obvious defensive purposes this country has developed very long range radar which are also known as over-the-horizen ($o$-$t$-$h$) radar. One such radar is the experimental MADRE radar developed by the Naval Research Laboratory. The contemplated use of the invention herein described is with the Madre radar. However, it will be apparent that the invention has broader utility and could also be used with other radar.

The information retrieval section of the signal processor of $o$-$t$-$h$ radar must recover extremely weak target echo signals which are obscured by noise. This invention improves the capability of $o$-$t$-$h$ radar by reducing the internal noise in the signal memory of the information retrieval section of the radar signal processor.

Prior to, and in contrast to, this invention, most of the attempts to improve the signal-to-noise ratio (S/N) in $o$-$t$-$h$ radar have been concerned with narrowbonding techniques or with integrating and canceling circuitry to reduce the effect of exterior noise or noise originating in the early stages of the receiver. Such prior attempts at noise reduction have, in general, been successful in accomplishing their intended purpose and have greatly increased the sensitivity and capability of $o$-$t$-$h$ radar.

SUMMARY OF THIS INVENTION

The invention herein described further increases the capability of $o$-$t$-$h$ radar by reducing the effects of noise, much of which originates in the electronic components of the signal storage section of the radar signal processor. This noise is only semi-random and is cyclic over the integration or storage period.

The primary concept of the invention is that the cyclic noise signal co-shares a second memory storage, the readout of which is divided into two channels, depending upon the signal strength. Signals above a predetermined threshold are used for display purposes while signals below this threshold are subtracted from incoming signals. The second memory, in other words, is used to store both the echo signals of interest, which are at high signal level and which are relatively rare and do not require many elements in the second memory, and the cyclic noise which is at low signal level. On readout from the second memory, these signals are separated on the basis of amplitude, the high level signals being displayed and the low level signals being used in noise reduction techniques.

OBJECT OF THE INVENTION

It is, therefore, an object of this invention to provide an improved $o$-$t$-$h$ radar.

Another object is to provide an improved $o$-$t$-$h$ radar wherein the effect of noise in the signal processor section is reduced.

Still another object is to provide a circuit for use in the $o$-$t$-$h$ radar which stores a noise signal representative of the noise in the signal memory section of the radar and substracts this stored noise signal from the signal memory in order to reduce or cancel this noise.

A still further object is to provide an improved $o$-$t$-$h$ radar which includes a circuit for reducing the effect of noise in the signal memory section of the radar receiver by subtracting a signal representative of the noise in the signal memory section from incoming signals.

DESCRIPTION OF THE FIGURES

The exact nature of this invention as well as other objects and advantages thereof will be readily apparent from consideration of the following specification relating to the annexed drawing in which is illustrated a preferred embodiment of the invention in block diagram form.

DESCRIPTION OF THE PREFERRED EMBODIMENT

Referring now to the drawing, numeral 10 identifies an input lead from the early stages of the receiver wherein received r-f pulse echo signals are amplified and reduced in frequency by conventional processes. Lead 10, which only rarely contains a target echo signal, is continuously and sequentially commutated into a plurality of range bins that, for convenience of illustration, are shown as the single component, signal memory 12. Component 12 is preferrably in the form of a capacitor matrix. It will be recognized that to this point the apparatus described is similar to that disclosed in the prior filed application Ser. No. 650,157.

Leads 14a through $n$, which equal in number the range bins in signal memory 12, conducts the continuous readout from signal memory 12 to an adder 16 that effectively functions as a decommutator since the range bin readout is sequential. In other words, the output of adder 16 in lead 18 is the readout of all of the samples stored in a certain range bin in signal memory 12, followed by the readout of all of the samples in the next sequential range bin, etc. Since actual target echo signals are extremely rare and are obscured by noise, the reader will comprehend that the signal in lead 18 is primarily the noise signal in signal memory 12. This noise signal is increased to a predetermined average level, such as 0.5 volt, by adjustable amplifier 20 and connected to an adder 22 for use in a manner which will be described later.

Each of the leads 14a through $n$ is also connected through components presently to be described, to a capacitor matrix data store unit 24 that is, element by element, identical to the capacitor matrix signal memory unit 12. For convenience, only the circuitry connected to lead 14a is illustrated.

Lead 14a is connected through a subtractor 26 and a contiguous filtering system 28 into an analysis section 30 wherein continual attempts are made to match the doppler frequency variation of any target echo signals which may have been received from the range and range bin associated with the lead 14a. The contiguous filtering system and analysis section is apparatus which implement narrow banding techniques as described in prior application Ser. No. 650,157. In the event a doppler frequency match is not made in analysis section 30, as when no target echoes are present, the output signal of section 30, which is connected to threshold unit 32, is a low level noise signal that is below the threshold of unit 32. In this circumstance unit 32 does not produce an output. If a frequency match is obtained, the output of analysis section 30 is above the threshold of unit 32, whereupon unit 32 produces an output of a predetermined level, such as 5.0 volts. The output of threshold unit 32 is connected to adder 22, as is the output of amplifier 20 and as are the analogous outputs related to leads 14b through n. The output of adder 22 is connected to capacitor matrix data store unit 24 through the rewrite component 34 which functions to prevent the decay of the signals stored on the elements of unit 24. Patent application Ser. No. 812,934 discloses circuitry which is suitable for use as the rewrite component 34.

Data store unit 24 is connected to the display section 36 of the radar which is not per se a part of the present invention and through threshold blocking unit 38 and adjustable attenuator 40 to the subtractor unit 26. The repetitive and sequential readout of unit 24 is either at the high (5 volt) level of signals from threshold unit 32, which will activate the display section, or at the low level of the signal from amplifier 20 which does not activate display section 36 and, as previously described, has been adjusted to average 0.5 volt. Threshold blocking unit 38 functions to block the large signals, that is, the output of threshold 38 is a reproduction of the noise signal from amplifier 20 except for holes (zero signal periods) which occur when the large signals from unit 32 are present. Adjustable attenuator 40, which may be mechanically connected to amplifier 20 as shown, functions to decrease the signal from threshold unit 38 to the same degree that adjustable amplifier 20 increases the signal from adder 16. For example, if amplifier 20 doubles the signal from adder 16, attenuator 40 will halve the signal from blocking threshold unit 38. The output of attenuator 40 is connected to the subtractor unit 26 wherein it is subtracted from the signal received from lead 14a. Attenuator 40 is also connected to similar subtractors associated with leads 14b . . . n.

By now the operation of the invention is apparent. The amplifier and heterodyning stages of the receiver are connected through lead 10 to the capacitor storage matrix, Signal Memory 12 wherein the receiver signal is repetitively commutated into a plurality of range bins that are sequentially readout into leads 14a . . . n which are connected to adder 16. Adder 16 effectively functions to decommutate the range bin signals so that the adder output signal in line 18, which is amplified by adjustable component 20 to a predetermined level, typically 0.5 volt, is a continuous scan of the signals stored in Signal Memory 12. Since target echo signals are rarely present, the adder output signal is primarily a noise signal and includes received noise and noise originating in the early receiver stages and in the Signal Memory 12. The amplified adder output signal is either continuously, or intermittently by use of switch 42, recorded and stored in capacitor matrix Data Store 24 (which is element by element similar to Signal Memory 12) after passage through adder 22 and rewrite component 34. For the purpose of convenient identification, the components 16, 18, 20 and 42 can be considered and termed the Noise Input Channel of the invention.

The continual and sequential readout from Data Store 24 is connected to a Feedback Channel consisting of blocking threshold 38 and attenuator 40 which functions to block any detected target echo signals (which are much larger, typically 5.0 volts, than the average 0.5 volt noise signal) and to attenuate the noise signal inversely to the amplification by component 20. The Feedback Channel, or more precisely the output of attenuator 40, is connected to subtractor 26 that is associated with lead 14a and to other subtractors associated with leads 14b . . . n.

In the subtractors, such as 26, the noise signal from the Feedback Channel is subtracted from the incoming range bin signals, such as in lead 14a, thereby increasing the S/N and consequentially the signal recovery capability of the Signal Input Channels, such as the one illustrated that consists of filtering system 28, analysis section 30 and threshold 32. Components 28 and 30 function according to narrow banding techniques that include doppler profile matching and which were described in a prior application. Any target echo signals that are recovered, if above a predetermined strength, are amplified by component 32 to a level, typically 5.0 volts, which is read into data store 24 through adder 22 and rewrite component 34 and which, upon being readout, is of sufficient amplitude to energize the display 36.

There has been disclosed an improved o-t-h radar which includes a circuit for reducing the effect of noise in the signal memory section of the radar receiver by subtracting a signal representative of the noise in the signal memory section from incoming signals.

Obviously many modification and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A canceler circuit for use in a radar having a receiver, comprising:
   data store means connected to receive the output signal of the receiver of said radar;
   feedback channel means connected to the output of said data store means functioning to pass only signals below a predetermined threshold;
   subtractor means connected to receive the outputs of said radar receiver and said feedback channel means and functioning to produce an output signal by subtracting the feedback channel output from the output of said radar receiver and
   signal input channel means connected to the output of said subtractor means and to the input of said data store means and functioning to detect target echo signals and to amplify said target echo signals above said predetermined threshold.

2. A noise canceler circuit for use in a radar comprising:
   signal memory means for storing the output of the radar receiver;
   display means for displaying signals above a first threshold amplitude;

data store means connected to said display means for storing signals to be displayed;

noise input channel means connecting the output of said signal memory means and the input of said data store means;

feedback channel means connected to the output of said data store means and functioning to block all signals above said first threshold and to pass all signals below said first threshold;

subtractor means connected to said feedback channel means and to the output of said signal memory means and functioning to produce an output signal which is the result of subtracting the signals passed by said feedback channel means from the output of said signal memory means and signal input channel means connected to the input of said data store means and to the output of said subtractor means and functioning to detect target echo signals in said subtractor means output signal and to amplify any of said detected signals which are above a second threshold to an amplitude which is greater than said first threshold.

3. The noise canceler circuit of claim 2 wherein the signal input channel means includes a contiguous filtering system and an analysis section wherein target echo signals are detected by narrow banding techniques which include doppler profile matching.

4. The noise canceler circuit of claim 3 wherein the noise input channel means includes an amplifier and the feedback channel means includes an attenuator which is inversely related to the gain of said amplifier.

5. The noise canceler circuit of claim 4 and further including rewrite means which are connected to the data store means and which function to prevent the decay of the signals stored in said data store means.

6. A radar receiver comprising:
first capacitor matrix means wherein signals to be displayed are stored;
display means connected to the output of said first capacitor matrix means for displaying signals which are above a first threshold;
feedback channel means connected to the output of said first capacitor matrix means for passing signals which are below said first theshold and blocking signals which are above said first threshold;
second capacitor matrix means connected to receive the radar return and to sequentially store said return in a plurality of range bins, each of which has an output lead, said first and second capacitor matrix means being substantially similar;
noise input channel means including a first adder connected to all of said plurality of range bin output leads;
a second adder connected between the output of said noise input channel and the input of said first capacitor matrix means;
a plurality of subtractors, each connected to said feedback channel means and to different ones of said plurality of range bin output leads and
a plurality of signal input channel means connected individually to different ones of said plurality of subtractors and to said second adder and functioning to detect target echo signals and to raise any detected target echo signals which are above a second threshold to be above said first threshold.

7. The radar receiver of claim 6 and further including rewrite means connected to the input of said first capacitor matrix means and having an input connected to the output of said second adder, said rewrite means functioning to prevent the decay of signals stored in said first capacitor matrix.

8. The radar receiver of claim 7 wherein said noise input channel means includes an adjustable amplifier connected between said first and second adders and said feedback channel means includes an adjustable attenuator connected between the output of said first capacitor matrix and said plurality of subtractors; means coupling said attenuator and said amplifier to inversely relate the attenuation of said attenuator to the gain characteristics of said amplifier.

* * * * *